A. H. HASTINGS.
Assignor to P. GMEHLIN.
Upright Piano-Forte Action.
No. 8,185. Reissued April 16, 1878.
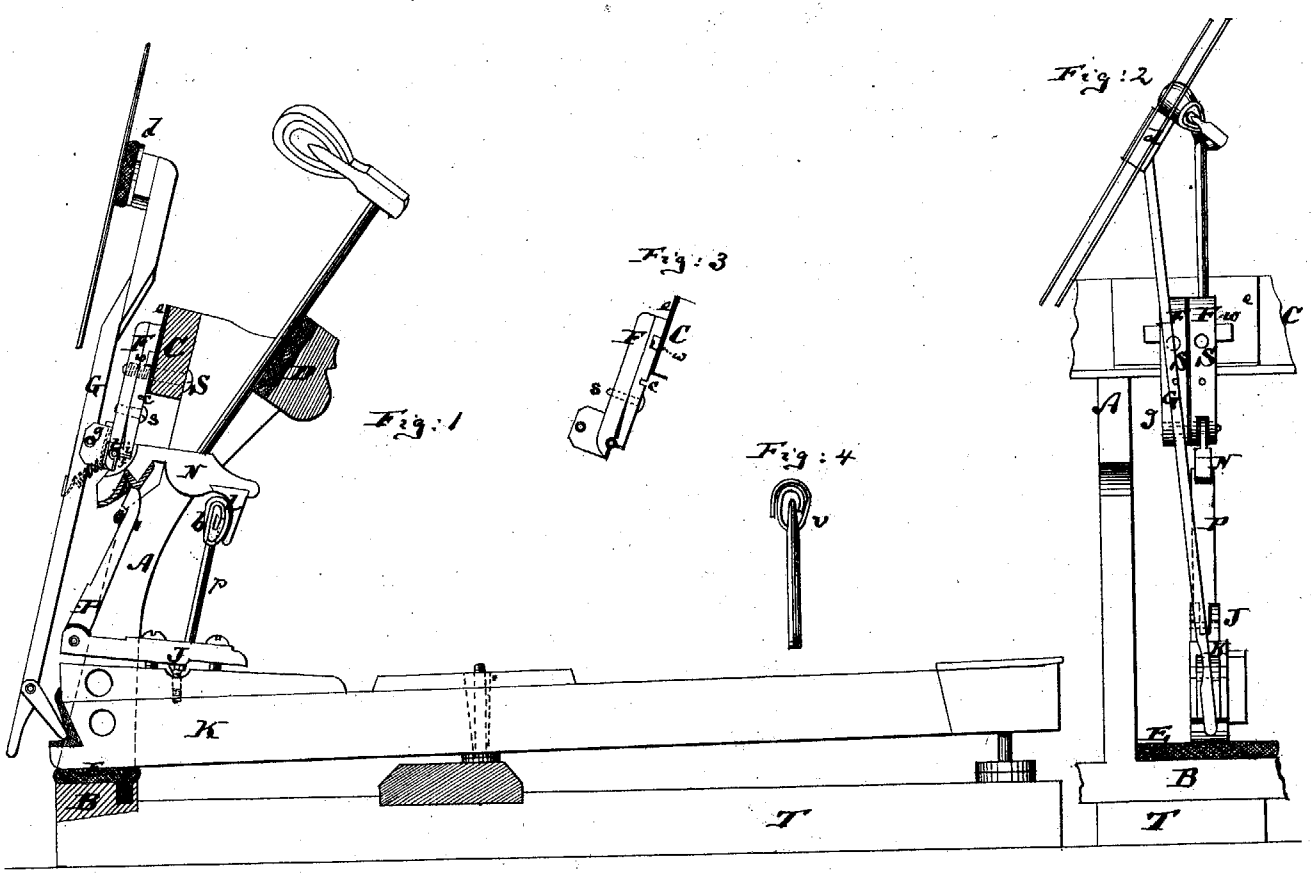
Witnesses:
John C. Tunbridge
James Dirk
Inventor:
A. Horace Hastings
by his attorney
A. v. Briesen
N. PETERS, PHOTO-LITHOGRAPHER, WASHINGTON, D. C.

UNITED STATES PATENT OFFICE.

A. HORACE HASTINGS, OF NEW YORK, N. Y., ASSIGNOR TO PAUL GMEHLIN.

IMPROVEMENT IN UPRIGHT PIANO-FORTE ACTIONS.

Specification forming part of Letters Patent No. 116,182, dated June 20, 1871; Reissue No. 8,185, dated April 16, 1878; application filed March 28, 1878.

*To all whom it may concern:*

Be it known that I, A. HORACE HASTINGS, formerly of Jersey City, in the county of Hudson and State of New Jersey, now of New York city, in the county of New York and State of New York, have invented certain new and useful Improvements in Upright Piano-Forte Actions; and I do hereby declare that the following is a full, clear, and exact description thereof, reference being had to the accompanying drawing, forming a part of this specification.

This invention relates to a new iron frame for upright pianos, which serves the purpose of a key-rest rail, hammer-rail, and damper-rail, all in one piece, and affords facility for the attachment of the hammer-rest rail.

It also consists in a provision made for tacking the cushion-cloth to the key-rest rail; also, in a novel method of securing the flanges of the hammers and dampers to the iron damper and hammer-rail; also, in a peculiar construction of the inner jaws of the hammer-flanges, whereby the cloth bushing which encircles the butt-pivot is preserved; also, in a novel construction of the hammer-flanges, which also serve as damper-flanges, whereby the dampers are so obliquely hinged that the one for each note, though operated by the key working the hammer of that note, is attached to the flange of the hammer which strikes the next note.

It further consists in a peculiar and more durable construction of the hammer-check.

In the accompanying drawing, Figure 1 is a transverse section of my improved action and frame. Fig. 2 is an end view of the same. Fig. 3 is a detached view of one of the hammer-flanges; and Fig. 4 is a view illustating the construction of the heads of the hammer-checks.

Similar letters of reference indicate corresponding parts in all the figures.

To enable others skilled in the art to make and use my invention, I will proceed to describe its construction and operation, with reference to the drawing.

A B C is a cast-iron frame, consisting of two horizontal and parallel rails, B and C, and two or more standards, A, all cast in one piece, the said rails being of sufficient length to include the entire action, and the standards being arranged one at or very near the ends of the rails, and one or more at suitable intervals between, to give the necessary stiffness to the rails. The lower part of the frame rests upon the cross-rails T of the key-frame. The standards are of suitable form to carry the hammer-rest rail D.

This frame so connects all the parts with the key-frame that the entire action can be at once removed from the instrument—a result never before accomplished in the action of upright piano-fortes.

Near the forward edge of the rail B is a series of holes or recesses, fitted with wooden plugs *a a*, for the purpose of receiving the tacks by which the cushion-cloth E is secured to the rail.

The hammer and damper rail C has holes drilled transversely through it for the reception of screws S S, which pass through it and screw into the wooden flanges F, and secure the latter to the rail.

Between the rail C and the flanges F F is a strip of cloth, *e*, and the said flanges are grooved or recessed on the back, near the upper end, to receive or fit a loose strip of wood, *w*, by means of which they are kept in the proper position parallel with each other. These flanges, which are best shown in Fig. 3, are each composed of two jaws, secured together by screws *s*.

The front of the rear jaw is recessed at *t* to receive the pivot of the hammer-butt N and the cloth bushing in which said pivot works; and the lower portion of the inner side of the forward jaw is cut away nearly to the end to form thereon a slight projection, *i*, opposite to the recess *t* in the rear jaw; and some distance above this projection the outer side of the jaw is notched at a point, *c*, to make it flexible at that point, that the projection *i* may be, by the screw *s*, pressed against the leather bush of the hammer-butt pivot *f*, to prevent it from working out.

By this construction of the jaws of the flanges the bushing is prevented from working into the crack between the jaws as the cloth wears, as is the case with the ordinary construction of jaw, and the jaws are prevented from coming together.

On the back of those flanges to which dampers are attached there extends a projection, *g*, having an oblique slot or recess extending across it, as shown in Fig. 2, dividing it into two cheeks, between which the damper-lever G is pivoted, the oblique direction of the slot being such that the damper-lever belonging to one key and note is carried by the same flange as the hammer of the next or a neighboring note. This enables a straight damper-lever to be used, avoiding the complication of a wire connection and a crooked leverage, and brings the upper end of the damper-lever, to which the damper is attached, into a position to operate upon an oblique string.

The damper-spring P is of the coiled kind, applied in the same way as that of the modern jack, one end being attached to the lever and the other to the flange. This spring, thus arranged, avoids much of the friction and the squeaking of the spring, as ordinarily applied.

The jack P is hinged to the bottom J in the usual manner. The hammer-check is secured to the front portion of the jack-bottom by driving or screwing its wire shank P thereinto.

The heads *b* of the checks are made of two pieces of cloth, leather, or other material, such as is commonly used, placed one over or outside of the other; but, instead of these pieces being simply lapped over the end of the wire and secured by gluing at their edges, the said pieces are each cut of a length to pass twice over or around the end of the wire, and the wire is passed through it, as shown in Fig. 4, which represents a side view of a shank, with one of the thicknesses of cloth, leather, or other material loosely applied, so that its structure may be seen.

The portion of the wire within the cloth or leather is flattened and roughened, and the cloth or leather, after having the wire inserted through it at the proper point *v*, has its interior surface glued and lapped over the wire in opposite directions, after which it is put in a caul, wherein it is pressed and dried.

The first piece of leather is put on over the top of the shank; but the second piece has to be put on at the other end by inserting the said end through it, and is afterward slipped up to the first piece and lapped over and glued in the same way.

The checks thus made are much more durable, the heads being less liable to become loose on the shanks.

What I claim as my invention, and desire to secure by Letters Patent, is—

1. The iron frame A B C for the action of an upright piano-forte, composed of two or more standards and of two horizontal rails or stretchers, all cast in one piece, substantially as specified.

2. The cast-iron frame A B C, constructed as described, to form the key-rest rail and the hammer and damper rail, and to support the hammer-rest rail, substantially as described.

3. The wooden plugs *a a*, in combination with the iron key-rest rail, for the purpose of receiving the tacks by which the cushion is secured to the rail, substantially as herein specified.

4. The detached wooden strip *w*, in combination with the grooves in the hammer-flanges, the screws S S, the hammer-rail C, and the interposed cloth *e*, substantially as described.

5. The combination of the projections *i* on the front jaws of the hammer-flanges, the notch *c* in the said jaw, and the recesses *t* in the back jaws, substantially as and for the purpose herein set forth.

6. The arrangement of the damper-lever in oblique positions, in which that for each note is supported by the flange which supports the hammer of the next or a neighboring note, substantially as and for the purpose described.

7. The head *b* of the hammer-check, constructed of continuous bands of cloth, leather, or other material, through which the shank passes, and which are each lapped twice over or around the head of the shank, substantially as and for the purpose herein described.

The foregoing description of my invention signed this 22d day of March, 1878.

A. H. HASTINGS.

Witnesses:
F. v. BRIESEN,
PAUL GMEHLIN.